US011526198B1

(12) United States Patent
Kanas et al.

(10) Patent No.: US 11,526,198 B1
(45) Date of Patent: Dec. 13, 2022

(54) ROLLABLE DISPLAYS WITH TENSION CONTROLS

(71) Applicant: HEWLETT-PACKARD DEVELOPMENT COMPANY, L.P., Spring, TX (US)

(72) Inventors: Derek Kyle Joseph Kanas, Spring, TX (US); Chan woo Park, Spring, TX (US)

(73) Assignee: Hewlett-Packard Development Company, L. P., Spring, TX (US)

( * ) Notice: Subject to any disclaimer, the term of this patent is extended or adjusted under 35 U.S.C. 154(b) by 0 days.

(21) Appl. No.: 17/388,938

(22) Filed: Jul. 29, 2021

(51) Int. Cl.
*G06F 1/16* (2006.01)

(52) U.S. Cl.
CPC .......... *G06F 1/1652* (2013.01); *G06F 1/1656* (2013.01)

(58) Field of Classification Search
CPC .................................................. G06F 1/1652
See application file for complete search history.

(56) References Cited

U.S. PATENT DOCUMENTS

| | | | | |
|---|---|---|---|---|
| 10,747,269 B1* | 8/2020 | Choi | ..................... | G06F 1/1643 |
| 10,877,523 B2* | 12/2020 | Huang | ................. | G06F 1/1652 |
| 11,051,413 B2* | 6/2021 | Yang | ..................... | G06F 1/1626 |
| 11,058,018 B1* | 7/2021 | Yoon | ..................... | G06F 1/1624 |
| 11,112,826 B2* | 9/2021 | Ko | ..................... | G06F 3/04817 |
| 11,283,910 B2* | 3/2022 | Lee | ..................... | H04M 1/0268 |
| 11,315,447 B2* | 4/2022 | Feng | ..................... | G06F 1/1652 |
| 11,416,036 B2* | 8/2022 | Yin | ..................... | G06F 1/1656 |
| 2006/0068859 A1* | 3/2006 | Lee | ..................... | H04M 1/0237 455/575.4 |
| 2007/0146243 A1* | 6/2007 | Ou Yang | ............... | G06F 1/1601 345/76 |
| 2013/0058063 A1* | 3/2013 | O'Brien | ............... | G06F 1/1624 361/807 |
| 2016/0062408 A1* | 3/2016 | Lee | ..................... | G06F 1/1641 345/173 |
| 2018/0014417 A1* | 1/2018 | Seo | ..................... | H05K 1/189 |
| 2018/0102072 A1* | 4/2018 | Lee | ..................... | G06F 1/1641 |
| 2020/0363841 A1* | 11/2020 | Kim | ..................... | G06F 1/1626 |
| 2021/0120111 A1* | 4/2021 | Choi | ..................... | G06F 1/1652 |
| 2021/0181801 A1* | 6/2021 | Yin | ..................... | H04M 1/0237 |
| 2021/0195009 A1* | 6/2021 | Choi | ..................... | H04M 1/0233 |
| 2021/0373603 A1* | 12/2021 | Feng | ..................... | G06F 1/1624 |
| 2021/0405696 A1* | 12/2021 | Ahn | ..................... | G06F 1/1647 |
| 2022/0117100 A1* | 4/2022 | Yoon | ..................... | H05K 5/0017 |
| 2022/0155823 A1* | 5/2022 | Shin | ..................... | G06F 1/1652 |
| 2022/0166861 A1* | 5/2022 | Lim | ..................... | H04M 1/0237 |

* cited by examiner

*Primary Examiner* — Hung S. Bui
*Assistant Examiner* — Sagar Shrestha
(74) *Attorney, Agent, or Firm* — Perry + Currier Inc.

(57) ABSTRACT

An example device comprises a rollable display. The example device further comprises an extending mechanism to adjust the rollable display between an extended position and a contracted position. The example device further comprises a tension mechanism to maintain an about constant tension on the rollable display as the rollable display is adjusted between the extended position and the contracted position.

13 Claims, 9 Drawing Sheets

ROLLABLE DISPLAYS WITH TENSION CONTROLS

BACKGROUND

Rollable displays, similar to flexible displays, are becoming more ubiquitous. However, mechanisms to unroll or roll the rollable displays between different positions may cause tension to change at the different positions, putting stress on the displays.

BRIEF DESCRIPTION OF THE DRAWINGS

Reference will now be made, by way of example only, to the accompanying drawings in which.

DETAILED DESCRIPTION

Figure 1:
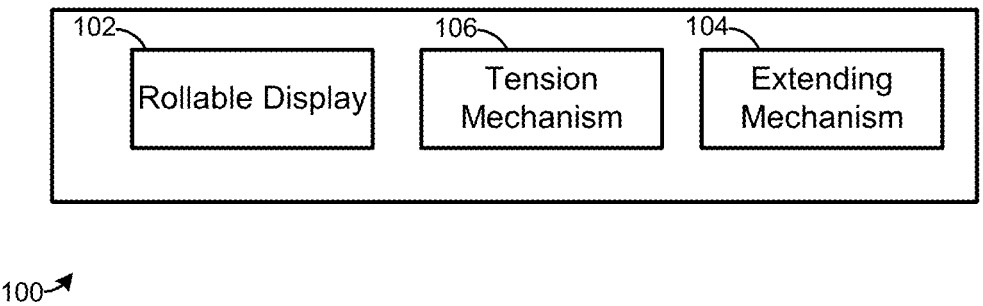
FIG. 1 is a schematic view of an example device that includes a rollable display with tension control.

Rollable displays, similar to flexible displays, are becoming more ubiquitous. However, mechanisms to unroll or roll the rollable displays between different positions may cause tension to change at the different positions, putting stress on the displays. Such changes in tension may also cause changes in tension on motors which roll, or unroll, the rollable displays, which can decrease reliability and/or lifetime thereof. For example, increases in tension generally results in a motor working harder.

As such, provided herein, are examples of devices that include rollable displays with tension control, and which include tension mechanisms that maintain an about constant tension on the rollable displays while rolling or unrolling and/or in different positions. In some examples, the example devices further include motors that roll, or unroll, the rollable display, and the tension mechanism generally enables tension on the motor to stay about constant regardless of a position of the rollable display.

In particular, an example device provided herein includes a rollable display. The device further includes an extending mechanism to adjust the rollable display between an extended position and a contracted position and/or positions therebetween. It is understood, however, that the extended position and the contracted position may respectively represent largest and smallest positions of the rollable display and that the rollable display may be extended or contracted to any suitable position therebetween. The extending mechanism may be manual, or the extending mechanism may include a motor to adjust a position of the rollable display.

The device further includes a tension mechanism to maintain an about constant tension on the rollable display as the rollable display is adjusted between the extended position and the contracted position. Such an about constant tension causes tension on a motor (e.g., when present) of the extending mechanism to stay about constant, which may generally reduce stress on the motor and/or may increase a lifetime thereof. As such, the about constant tension may further minimize and/or reduce torque requirement of the motor (e.g., as compared to changeable tensions which may cause higher torque requirements) and which may reduce a size and/or weight and/or cost of such a motor.

The tension mechanism may include a belt around two rotating pins at opposing ends of the belt, the belt attached in one position to a stationary frame of the device, the belt otherwise to roll around the rotating pins in conjunction with movement of the extending mechanism as the rollable display is extended or contracted. The belt may be attached to a slidable frame which is moved by the extending mechanism to assist with extending or contracting of the rollable display, and the belt may roll as the slidable frame is moved. For example, the belt may be attached to the slidable frame via pins, the pins being attached to the slidable frame. The slidable from may be moved by the extending mechanism to assist with extending or contracting of the rollable display, and the belt may roll around the pins as the slidable frame is moved. A direction of movement (e.g., rolling) of the belt depends on whether the rollable display is being extended or contracted. In these examples, the tension mechanism may further include a spring and/or spring mechanism extending between a given position of the belt (e.g., a hook) and an end of the rollable display (e.g., another hook), the spring maintaining the about constant tension on the rollable display. For example, as the belt rolls around the rotating pins, a distance between the given position of the belt and the end of the rollable display remains about constant and hence the length of the spring mechanism remains about constant, causing the tension applied by the spring mechanism to the rollable display, as well as tension on a motor of the extending mechanism, to remain about constant.

In a particular example, the tension mechanism may be attached to the slidable frame that slides relative to the stationary frame, and a motor may move the slidable frame to roll the belt around the pins, which causes the given position of the belt, to which the spring mechanism is attached, to move. As such, as the motor moves the slidable frame, the belt rolls, causing the given position of the belt to move, and the rollable display to roll or unroll (e.g., depending on direction of movement of the slidable frame) with the tension provided by the spring mechanism remaining about constant.

An aspect of the present specification provides a device comprising: a rollable display; an extending mechanism to adjust the rollable display between an extended position and a contracted position; and a tension mechanism to maintain an about constant tension on the rollable display as the rollable display is adjusted between the extended position and the contracted position.

Another aspect of the present specification provides a device comprising: a rollable display; a stationary frame; a slidable frame slidably attached to the stationary frame, the slidable frame being in two portions that move in opposite directions, relative to the stationary frame; rollers around which opposing ends of the rollable display roll as the two portions move, the rollers attached to the two portions, and the rollers moving with the two portions; and tension mechanisms attached to the two portions that move with the two portions, the tension mechanisms further attached to opposing ends of the rollable display to maintain an about constant tension on the rollable display as the rollable display rolls around the rollers as the two portions move.

Yet a further aspect of the present specification provides a device comprising: a rollable display having opposing ends; movable rollers around which the rollable display rolls, as the movable rollers move, such that the opposing ends move relative to the movable rollers; belts that move with the movable rollers and the opposing ends, respective given portions of the belts being in a fixed position relative to the movable rollers and the opposing ends, a remainder of belts rotating as the belts move with the movable rollers; and springs respectively attached to respective moveable attachments points of the belts and respective ends, of the opposing ends, of the rollable display, the respective moveable attachment points moving a same distance as the opposing ends of the rollable display as the belts rotate, and as the rollable display rolls around the movable rollers, such that the springs maintain a constant tension on the rollable display.

Attention is next directed to FIG. 1 which depicts a block diagram of an example device 100 that generally includes a rollable display with tension control. The device 100 may include, and/or be a component of, a laptop device, a notebook device, a tablet device, a portable device, combinations thereof, or any suitable device into which a rollable display may be incorporated. While only certain components of the device 100 are depicted, it is understood that the device 100 may include any suitable combination of components to provide the device 100 with any suitable functionality. For example, while not depicted, the device 100 may include a processor, and the like, for controlling a motor of an extending mechanism thereof (though, as will be described below, an extending mechanism may not include a motor and/or may be manually operated). However, such a processor may provide other functionality for the device 100, such as executing applications, operating systems, messaging and/or telephonic functionality, and the like. The device 100 may further include other suitable components such as input devices, radios, network interfaces, and the like.

As depicted, the device 100 includes: a rollable display 102; an extending mechanism 104 to adjust the rollable display 102 between an extended position and a contracted position; and a tension mechanism 106 to maintain an about constant tension on the rollable display 102 as the rollable display 102 is adjusted between the extended position and the contracted position. Examples of the rollable display 102, the extending mechanism 104 and the tension mechanism 106 are described in more detail below with regards to FIGS. 2 to 10.

The rollable display 102 may comprise any suitable flexible display which is rollable including, but not limited to, organic light emitting displays (OLEDs) and/or any other suitable electronic rollable display and/or rollable display screen. In such examples, the device 100 may include electronic connections to the rollable display 102 from a processor (e.g., a Graphics Processing Unit (GPU)) and the like, which may be a component of the device 100, or external to the device 100, the processor to drive electronics of the rollable display 102.

However, the rollable display 102 need not be electronic and may comprise a printed display with information printed thereon.

Regardless, it is understood that a portion of the rollable display 102, for example a portion viewable at the device 100 when the rollable display 102 is in a contracted position, may be viewable regardless of whether the rollable display 102 is in the contracted position or the extended position. Furthermore the rollable display 102 may be rollable to any suitable position between the extended position and the contracted position.

Furthermore, the rollable display 102 is understood to have an end, or ends, which roll and unroll. Indeed, the rollable display 102 may roll, and unroll, at one end, or opposing ends.

While described in more detail below (e.g., see FIG. 2, FIG. 3, FIG. 4 and FIG. 7), the extending mechanism 104 may comprise a motor in a fixed position, relative to the rollable display 102 which causes the rollable display 102 to move between the extended position and the contracted position (e.g., and positions therebetween). The motor may be attached to a stationary frame. The extending mechanism 104 may include a gear assembly that is movable by the motor to move an end, or opposing ends, of the rollable display 102. However, when no motor is present, and the rollable display 102 is moved manually (e.g., see FIG. 10), such a gear assembly may be absent or present. In particular, the gear assembly may be to extend, or contract, opposing ends of the rollable display 102 at about a same rate and/or distance such that the rollable display 102 is extended or contracted about symmetrically at the opposing ends.

The extending mechanism 104 may further comprise a roller, or rollers (e.g., see FIG. 2, FIG. 3, FIG. 4, FIG. 7, FIG. 8 and FIG. 9), that respectively move with an end, or respective opposing ends, of the rollable display 102, the rollable display to roll around the roller, or the rollers.

The extending mechanism 104 may further comprise a stationary frame; and a slidable frame (e.g., see FIG. 2, FIG. 3, FIG. 4, FIG. 5, FIG. 6, FIG. 7, FIG. 8, FIG. 9 and FIG. 10) that moves relative to the stationary frame. In a particular example, the motor and the gear assembly, when present, may move the slidable frame relative to the stationary frame (e.g., with the motor attached to the stationary frame), and the tension mechanism 106 may be attached to the slidable frame.

The tension mechanism 106 may comprise a belt around two rotating pins at opposing ends of the belt (e.g., see FIG. 2, FIG. 8 and FIG. 9), the belt attached in one position to the stationary frame, the belt otherwise to roll around the rotating pins in conjunction with movement of the extending mechanism as the rollable display is extended or contracted. The tension mechanism 106 may further comprise a spring mechanism extending between a given position of the belt and an end of the rollable display, the spring mechanism maintaining the about constant tension on the rollable display 102, a distance between the given position of the belt and the end of the rollable display 102 remaining about constant as the belt moves around the rotating pins as the rollable display 102 is extended or contracted.

However, the device 100 may comprise more than one tension mechanism 106 and/or a plurality of tension mechanisms, including, but not limited to, two tension mechanisms 106 per end of the rollable display 102 which rolls and unrolls.

In a particular example, the device 100 may include an input device which may be used to actuate a motor of the extending mechanism 104 to cause the rollable display 102 to move between an extended position and a contracted position. In some of these examples, the input device may be used to provide input to a processor of the device 100 to cause the processor to control the motor accordingly. In other examples, the device 100 may cause the rollable display 102 to extend or contract based on an application being executed at the device 100. For example, a processor of the device 100 may execute an application that plays video at the rollable display 102; the processor may detect an aspect ratio of the video and control the rollable display 102 to move between the extended position and the contracted position depending on an aspect ratio of the video. For example, the contracted position of the rollable display 102 may correspond to a 4:3 aspect ratio of a video being played at the device 100 and the rollable display 102 may be automatically adjusted to the contracted position accordingly by a processor of the device 100. Similarly, the extended position of the rollable display 102 may correspond to a 16:9 aspect ratio of a video being played at the device 100 and the rollable display 102 may be automatically adjusted to the extended position accordingly by a processor of the device 100. Positions of the rollable display 102 between the extended position and the contracted position may correspond to other aspect ratios of other videos to which the rollable display 102 may be adjusted.

A device 200 is next described in more detail with respect to FIGS. 2 to 9, the device 200 comprising a specific example of a device that generally includes a rollable display with tension control. The device 100 may comprise the device 200 and indeed, hereafter, examples of the various components of the device 100 will be described with respect to the device 200, though variations of the device 200 are within the scope of the present specification. For example, while the device 200 includes a rollable display that rolls and unrolls from opposing ends, in other examples the device 200 may be modified such that the rollable display rolls and unrolls from one end. Similarly, while two tension mechanisms are depicted per opposing end of the rollable display of the device 200, the device 200 may include as few as one tension mechanism per opposing end of the rollable display, or more than two tension mechanisms per opposing end of the rollable display.

Figure 2:
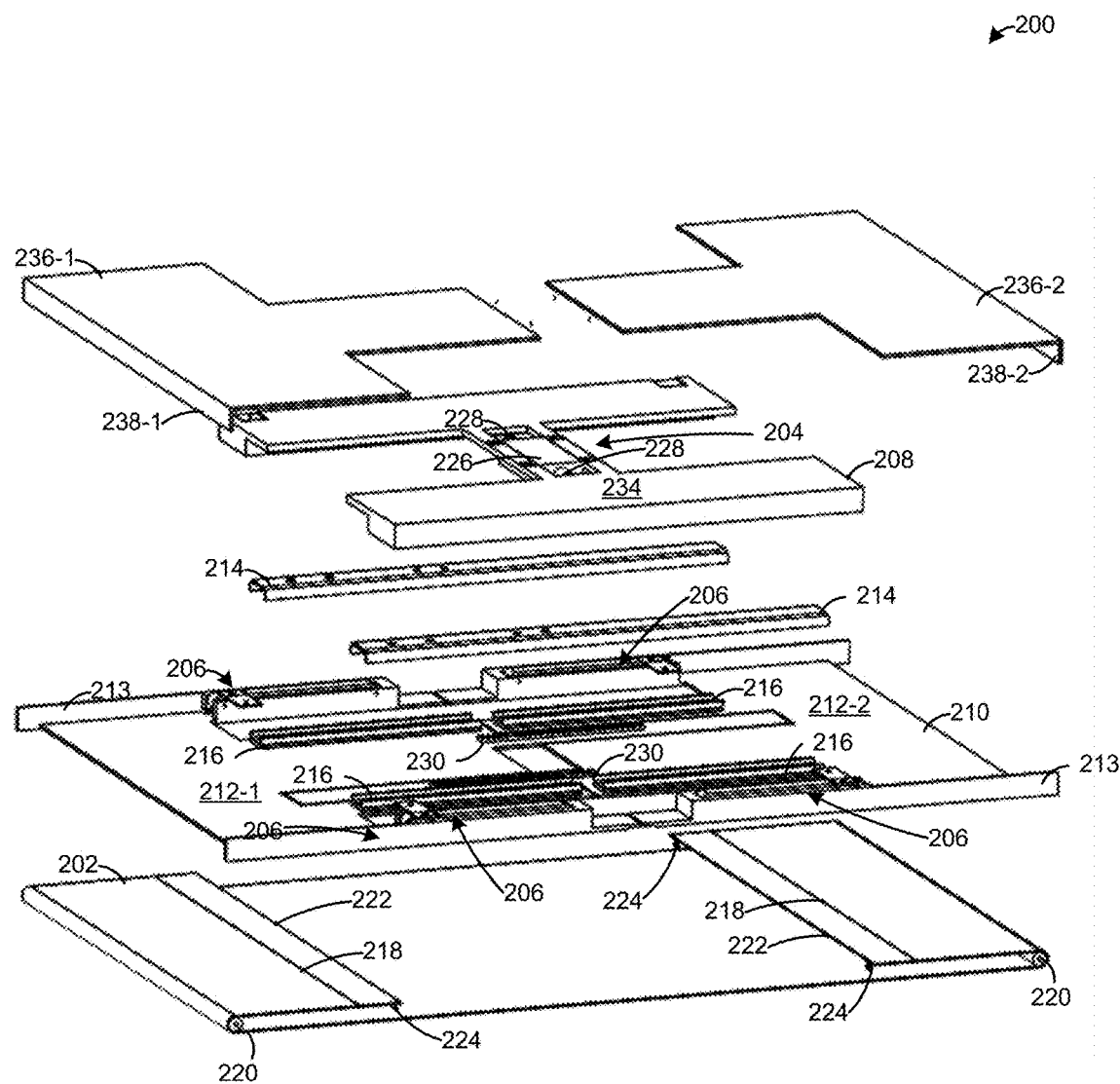
FIG. 2 is an exploded view of another example device that includes a rollable display with tension control.

With attention directed to FIG. 2, which depicts an exploded view of the device 200, the device 200 includes a rollable display 202, an extending mechanism 204 and tension mechanisms 206 (e.g., four tension mechanisms 206). While the extending mechanism 204 is generally indicated at one position that corresponds to a motor (see below), other components of the extending mechanism 204 are described hereafter.

Furthermore, while the rollable display 202, the extending mechanism 204 and the tension mechanisms 206 of FIG. 2 show examples of the rollable display 102, the extending mechanism 104 and the tension mechanism 106 of the device 100 of FIG. 1, other examples of the rollable display 102, the extending mechanism 104 and the tension mechanism 106 of the device 100 are within the scope of the present specification.

In particular, the device 200 further includes a stationary frame 208 and a slidable frame 210 slidably attached to the stationary frame 208. The frames 208, 210 may be of any suitable material such as metal, plastic, and the like. Indeed, any of the components herein may be of any suitable material that is compatible with their respective functionality.

As depicted, the slidable frame 210 is in in two portions 212-1, 212-2 that move in opposite directions, relative to the stationary frame 208. The portions 212-1, 212-2 will be interchangeably referred to hereafter, collectively, as the portions 212 and, generically and/or individually, as a portion 212; this convention will be used elsewhere in the present specification. As depicted, the portions 212 comprises plates, and/or are plate-shaped, though, in the depicted examples, the portions 212 include respective sidewalls 213 perpendicular to the plates.

As depicted, the portions 212 move in opposite directions via grooves 214 and slide rails 216 respectively attached to the stationary frame 208 and the slidable frame 210, with two grooves 214 attached to opposite sides of the stationary frame 208, and two complementary slide rails 216 attached to a portion 212. As depicted, a slide rail 216 on a given portion 212 slides within a corresponding complementary groove 214, with two slide rails 216 (e.g., one per portion 212) sliding along a given groove 214.

Figure 5:
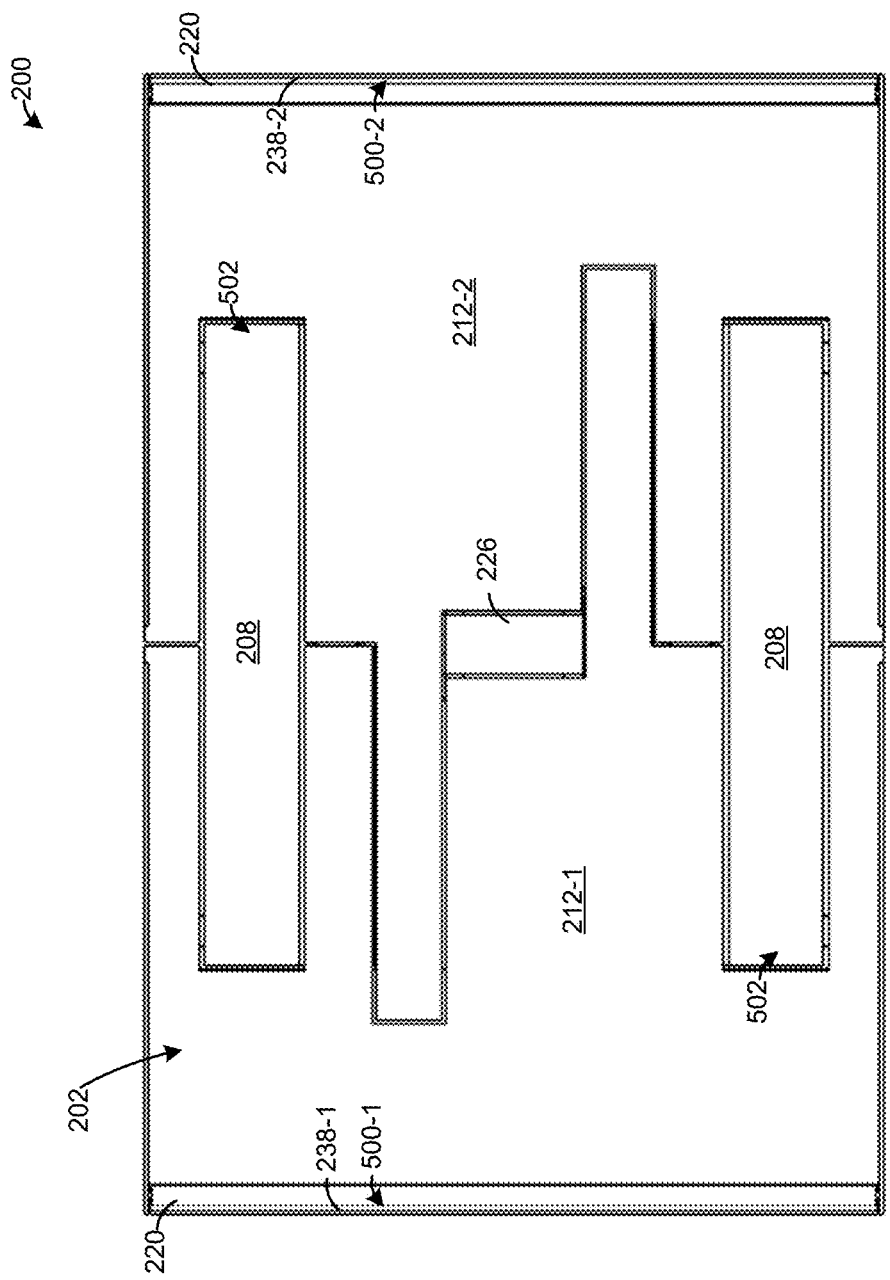
FIG. 5 is a front view of the example device of FIG. 2, with the rollable display in the contracted position.
Figure 6:
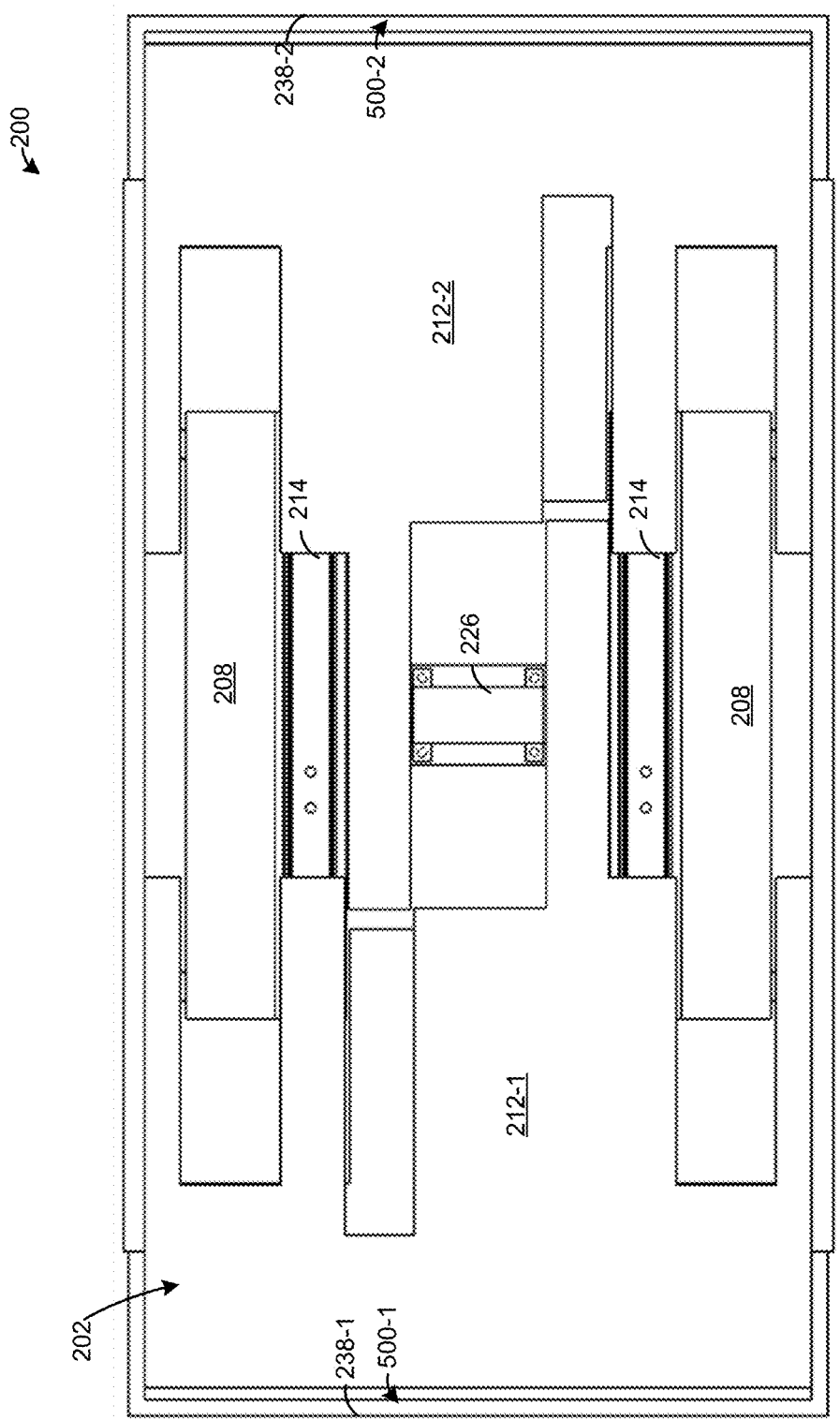
FIG. 6 is a front view of the example device of FIG. 2, with the rollable display in the extended position.

Furthermore, the portions 212 are understood to have complementary shapes such that, when the portions 212 slide towards each other, for example when the rollable display 202 is in the contracted position, various parts of the portions 212 receded into each other (e.g., as best seen in FIG. 5 and FIG. 6), which may provide stability of the portions 212 relative to each other.

Furthermore, while in the exploded view of FIG. 2, the portions 212 of the slidable frame 210 are depicted as separate from the rollable display 202, when assembled, it is understood that opposite ends 218 of the rollable display 202 are around the portions 212 of the slidable frame 210, for example as best seen in FIG. 3, FIG. 4, FIG. 7, FIG. 8 and FIG. 9.

In particular, as depicted, the device 200 further includes rollers 220 (e.g., cylindrical rollers) around which the opposing ends 218 of the rollable display 202 roll as the two portions 212 move. The rollers 220 may be of any suitable material that may engage the rollable display 202, for example from a rear side thereof, in order to assist the rollable display 202 with rolling or unrolling there around.

While the rollers 220 are depicted in FIG. 2 as separate from the portion 212, it is understood that the rollers 220 are attached to the two portions 212 (e.g., a roller 220 per portion 212) at respective ends of the portions 212 that are furthest away from the stationary frame 208. For example, the rollers 220 may be attached to a respective portion 212 via pins in complementary holes in the portions 212 at opposite ends of the rollers 220. Hence, the rollers 220 are understood to be attached to the portions 212 and it is further understood that the rollers 220 rotate with respect to the portions 212. It is further understood that the rollers 220 move with the two portions 212 such that, when the portions 212 extend away from the stationary frame 208, the rollers 220 also move away from the stationary frame 208, exerting pressure on the rollable display 202 to extend the rollable display 202, with the rollable display 202 rolling around the rollers 220. As such, the rollers 220 may alternatively be referred to as movable rollers, as the rollers 220 move as the two portions 212 move.

As depicted, the tension mechanisms 206 are also attached to the two portions 212 and move with the two portions 212, the tension mechanisms 206 further attached to the opposing ends 218 of the rollable display 202 to maintain an about constant tension on the rollable display 202 as the rollable display 202 rolls around the rollers 220, as the two portions 212 move. Details of the tension mechanisms 206 will be described below with respect to FIG. 3, FIG. 4, FIG. 7, FIG. 8 and FIG. 9. However, it is understood that the tension mechanisms 206 comprise respective belts and spring mechanisms (not visible in FIG. 2).

Furthermore, as depicted, the device 200 further comprises fixtures 222 at the opposing ends 218 of the rollable display 202. For example, the fixtures 222 may be of a stiff material such as hard plastic and/or metal and may be attached to the opposing ends 218 in any suitable manner, such as via an adhesive, clamps, and the like. While not depicted in FIG. 2, the tension mechanisms 206 are understood to be attached to the fixtures 222. For example, as depicted, the fixtures 222 include hooks 224 and/or attachment points, to which spring mechanisms of the tension mechanisms 206 are attached (e.g., see FIG. 8 and FIG. 9). While the attachment points are shown in the form of the hooks 224, the attachment points may be in any suitable configuration; hence, while the term "hooks" is used hereafter, it is understood that the hooks 224 may be replaced with any suitable attachment mechanism. Furthermore, there may be one hook 224 per tension mechanism 206; hence, as there are four tension mechanisms 106, there are four hooks 224 (e.g., three of which are visible in FIG. 2, a fourth hook 224 hidden due perspective in FIG. 2), with two hooks 224 per fixture 222 as there are two tension mechanisms 206 per opposite end 218 of the rollable display 202.

Hence, as depicted, for a respective portion 212 of the two portions 212 of the slidable frame 210, there is one respective roller 220 and two respective tension mechanisms 206. Similarly, fora respective end 218 of the rollable display 202, there is one fixture 222 and two hooks 224, one per tension mechanism 206 attached to an end 218 and/or fixture 222.

As depicted, the extending mechanism 204 includes a motor 226 attached to the stationary frame 208. Furthermore, circular gears 228 extend from opposite sides of the motor 226, and are understood to be driven by the motor 226. For example, the circular gears 228 are understood to be attached to respective drive shafts of the motor 226, extending from opposite sides thereof, about perpendicular to the grooves 214 and rails 216. The motor 226 is understood to drive the circular gears 228 in opposite directions.

The extending mechanism 204 further comprises linear gears 230, one per portion 212 and attached to a respective portion 212, which interface with the circular gears 228. The linear gears 230 are understood to be about parallel to the grooves 214 and rails 216, and about perpendicular to drive shafts of the motor 226 to which the circular gears 228 are attached.

Together, the gears 228, 230 form respective gear assemblies, and/or rack and pinion gear assemblies and/or rack and pinion drives and/or linear actuators. The motor 226 is generally to rotate the circular gears in opposite directions relative to one another, such that, when the motor 226 is in a first mode, the circular gears 228 are rotated to move the linear gears 230 in opposite directions to cause the portions 212 to move away from each other, for example along a fixed path defined by the grooves 214 and the rails 216, thereby extending the rollable display 202. Similarly, when the motor 226 is in a second mode, the circular gears 228 are rotated to move the linear gears 230 in respective directions opposite to that of the first mode (e.g., and also opposite to each other) to cause the portions 212 to move towards from each other, for example along the fixed path defined by the grooves 214 and the rails 216, thereby contracting the rollable display 202. Operation of the extending mechanism 204 is described in more detail with respect to FIG. 7, FIG. 8 and FIG. 9.

Furthermore, as depicted, the stationary frame 208 is understood to be in an "H" shape, with long sides of the "H" joined by a short side, the motor 226 attached to the short side. The long sides of the "H" are shaped to extend along the portions 212 and/or towards the ends 218 of the rollable display 202, and are further shaped to accommodate the length and/or shape of the grooves 214, with respective grooves 214 being attached to respective long sides of the "H" at a side facing the rollable display 202.

While not depicted, the device 200 may further comprise a back cover, for example attached to a backside 234 of the stationary 208 (e.g., a side opposite that of the rollable display 202). Such a back cover is generally to hide and protect internal components of the device 200 and may bend around (e.g., at 90°) at opposing sides to cover sides of the device 200, such as the sidewalls 213 of the portions 212 of the slidable frame 210.

Furthermore, as depicted, the device 200 further comprises plates 236-1, 236-2 (e.g., plates 236 and/or a plate 236). The plates 236 are generally attached to a respective portion 212 and move with a respective portion 212; for example, the plate 236-1 is attached to the portion 212-1, and the plate 236-2 is attached to the portion 212-2. As such, the plates 236 may form a part of the slidable frame 210, and may be present to hide various part of the device 200. However, the plates 236 may be optional.

When present, a back cover may be to generally hide internal components of the device 200 at a back side thereof (e.g., a side opposite to that of the rollable display 202, which may be at a front side of the device 200), and the plates 236 may extend out from under such a back cover when the rollable display 202 is extended (e.g., the plates 236 move with the portions 212) to hide internal components of the device 200 that extend out from such a back cover when the rollable display 202 is extended. As depicted, the plates 236 are "T" shaped, with a central leg and/or portion of the "T" to move between the long sides of the "H" of the stationary frame 208. Ends 238-1, 238-2 (e.g., ends 238 and/or an end 238) of the plates 236 furthest from the motor 226 (e.g., at a cross-portion of the "T"), are at about 90° to a remainder of a plate 236 to bend around and hide parts of the rollable display 202 that are around the rollers 220. As such, the ends 238 generally form respective slits with respective ends of the portions 212, from which the rollable display 202 extends, and into which the rollable display 202 contracts, as best seen in FIG. 5 and FIG. 6.

While depicted in FIG. 2, the device 200 may further comprise a front cover, at a front side of the device 200, to cover and/or protect the rollable display 202. When present, such a front cover is generally transparent, at least in a region of the rollable display 202, such that the rollable display 202 is viewable therethrough. Portions of such a front cover may, however, be opaque to hide edges of the rollable display 202 (e.g., that don't emit light), to form a visual "bezel" for the rollable display 202. Such a front cover may be of a size that covers the rollable display 202 in both the extended and contracted positions; in other examples, such a front cover may be extendible and contractable. Such a front cover may be attached to any other suitable component of the device 200 in any suitable manner, including, but not limited to, a back cover. Hence, such a front cover may be provided in the form of a two dimensional plate, and/or any other suitable shape.

Figure 3:
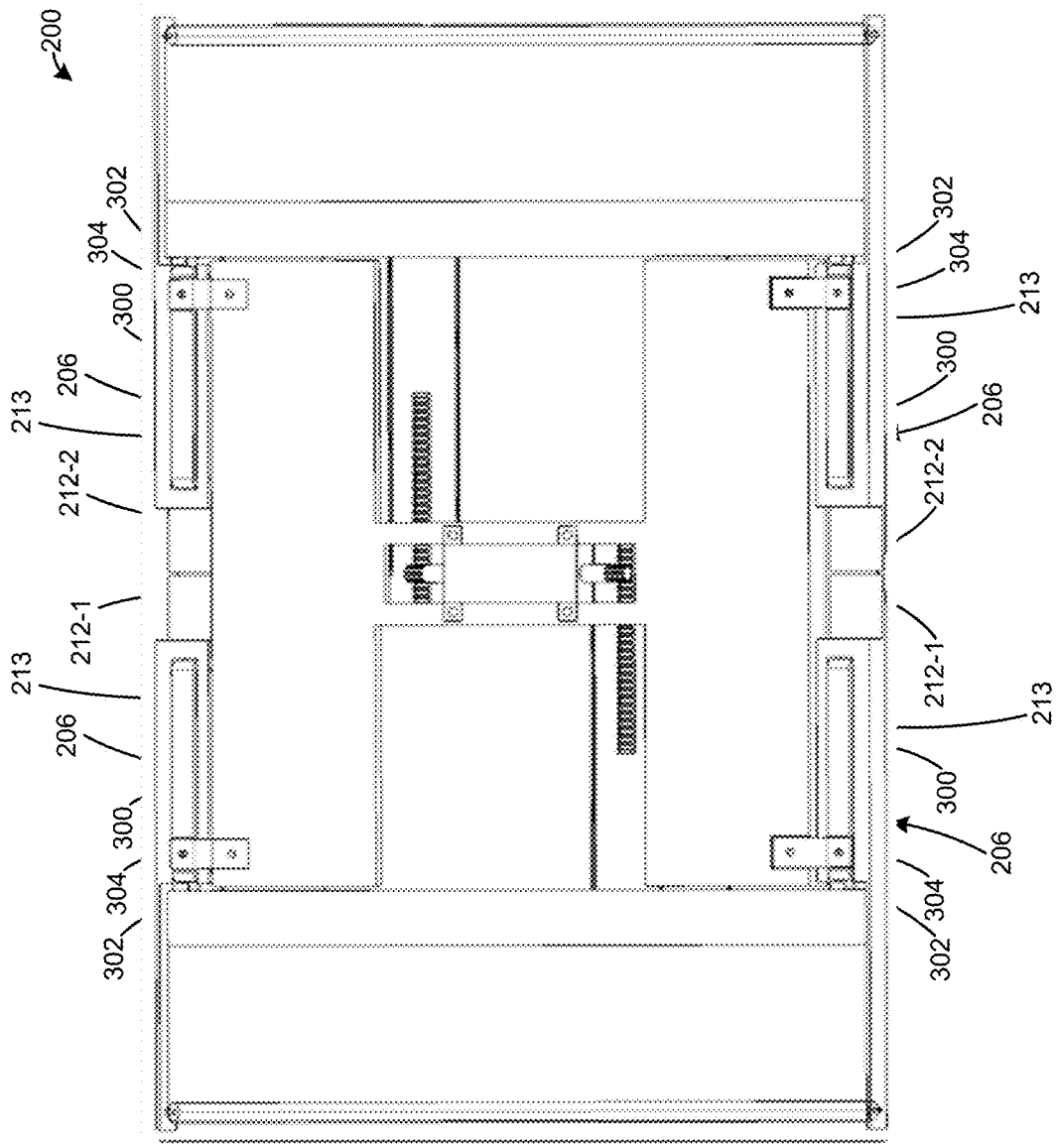
FIG. 3 is a rear view of the example device of FIG. 2, with the rollable display in a contracted position.
Figure 4:
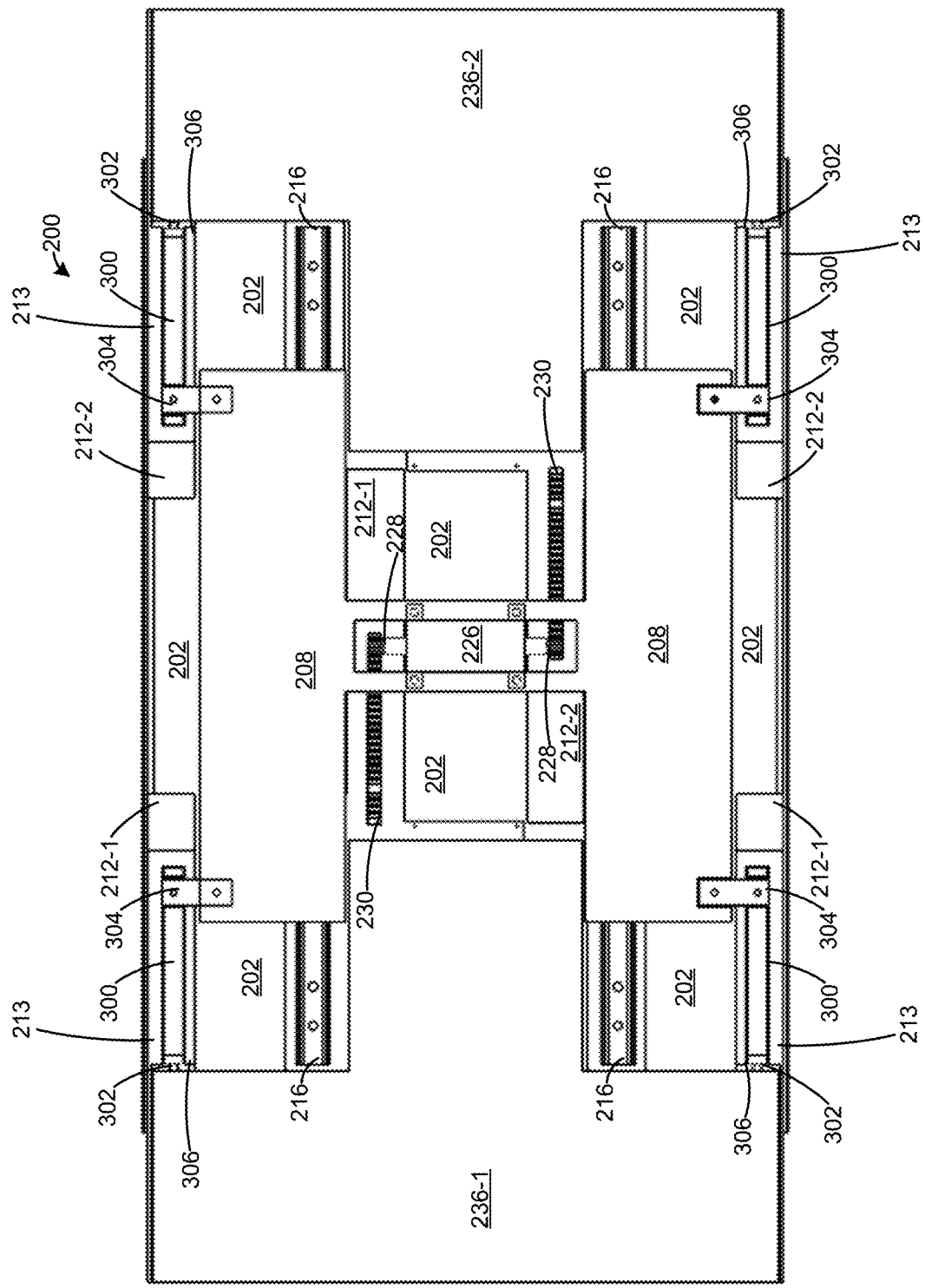
FIG. 4 is a rear view of the example device of FIG. 2, with the rollable display in an extended position.

Attention is next directed to FIG. 3 and FIG. 4 which depict a back side of the device 200, with the device 200 assembled. While not depicted, a back cover may be present to hide internal components of the device 200. FIG. 3 depicts the rollable display 202 in a contracted position and FIG. 4 depicts the rollable display 202 in an extended position. While the rollable display 202 is not depicted in FIG. 3 and FIG. 4, the rollable display 202 is nonetheless understood to be present on a side opposite that depicted in FIG. 3 and FIG. 4.

In particular, in FIG. 3, the plates 236 are understood to be mated with the stationary frame 208 when the rollable display 202 is in the contracted position (e.g., a central leg and/or portion of the "T" portion of the plates 236 are between the long sides of the "H" of the stationary frame 208). As also seen in FIG. 3, the circular gears 228 are mated with the linear gears 230 such that when the circular gears 228 are turned by the motor 226, the portions 212 move away from each other in opposite directions, as do the plates 236.

Also depicted in FIG. 3, are some further details of the tension mechanisms 206. In particular, as depicted, a tension mechanism 206 may comprise: a belt 300, for example rollably attached to a respective portion 212 of the two portions 212 of the slidable frame 210; a spring 302 (and/or any suitable spring mechanism) extending between a given position of the belt 300 and a respective end 218 (and/or a respective fixture 222) of the rollable display 202; and a brace 304 attaching the belt 300 to the stationary frame 208, such that, as a respective portion 212 to which a respective belt 300 is attached (e.g., described in more detail below with respect to FIG. 7, FIG. 8 and FIG. 9), a section of the belt 300 attached to the brace 304 remains stationary relative to the stationary frame 208, and a remainder of the belt 300 rotates relative to the stationary frame 208 to maintain an about constant distance between the given position of the belt 300 and the respective end 218 of the rollable display 202.

While the term "brace" is used to describe a mechanism that attaches a section of the belt 300 to the stationary frame 208, the brace 304 is understood to include any suitable attachment mechanism.

In particular, as depicted, the belt 300 is attached to a respective portion 212 between a respective sidewall 213 and an opposing sidewall 306, for example via pins best seen in FIG. 8 and FIG. 9, described below. The sidewalls 213, 306 may be interchangeably referred to as opposing sidewalls 213, 306.

Figure 8:
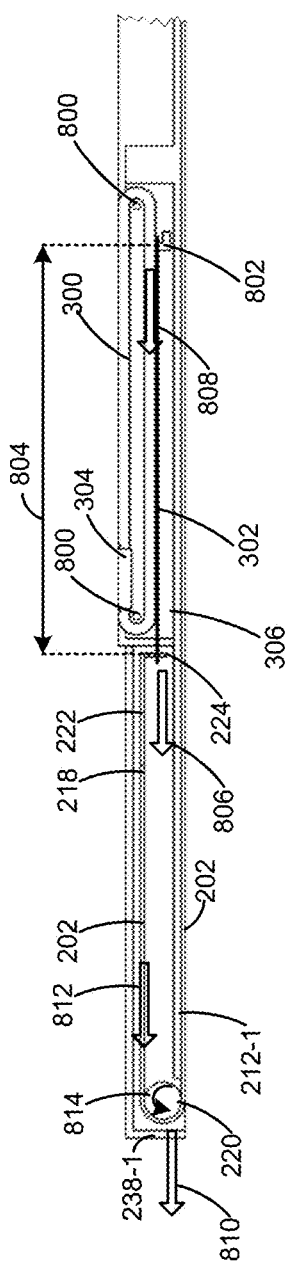
FIG. 8 is an example tension mechanism of the example device of FIG. 2, with the rollable display in the contracted position.
Figure 9:
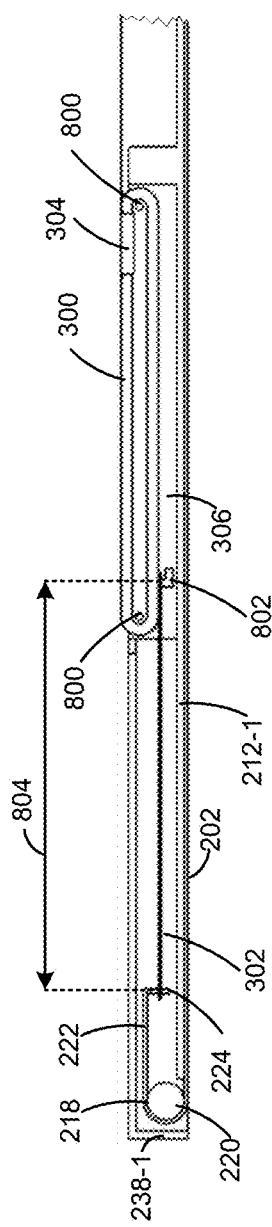
FIG. 9 is an example tension mechanism of the example device of FIG. 2, with the rollable display in the extended position.

In particular, a spring 302 may comprise any suitable spring and/or spring mechanism that is attached to a respective hook 224 and similarly attached to a given position of a belt 300, for example also using a hook, and the like, at the belt 300 (e.g., see FIG. 8 and FIG. 9).

In particular, a brace 304 may comprise a rigid material attaching a section of a belt 300 to the stationary frame 208 at a given position such that, in a contracted position, a substantial majority of the belt 300 is to one side a respective brace 304, for example towards a center of the device 200 and/or towards the motor 226 and/or away from an end 218 of the rollable display 202.

Attention is next directed to FIG. 4, is substantially similar to FIG. 3, but with the rollable display 202 in the extended position.

In contrast with FIG. 3, in FIG. 4, the motor 226 has been actuated (e.g., by a processor, and/or via an input device, and the like) to move the rollable display 202 to the extended position. As such, the circular gears 228 are understood to have turned to move the linear gears 230, to move the portions 212 away from each other for example via the grooves 214 (not depicted, but nonetheless understood to be present) and rails 216. In particular, the plates 236 are seen to extend from opposite ends of the device 200 and further may extend from a back cover when present.

Furthermore, comparing positions of the braces 304 in FIG. 3 and FIG. 4, it is apparent that the braces 304 have remained stationary relative to the stationary frame 208, and hence so have the sections of the belts 300 attached to the braces 304. However, the belts 300 have rotated to move a substantial portion of the belts towards the ends 218 of the rollable display 202. Such movement is described below with respect to FIG. 7, FIG. 8 and FIG. 9. However, in particular, about a same portion of the belt 300 that is to one side of a respective brace 304 in FIG. 3 has moved to the other side of the respective brace 304 in FIG. 4.

FIG. 5 and FIG. 6 depict a front of the device 200 with the rollable display 202, respectively, in a contracted and extended position. The rollable display 202 is depicted as transparent in FIG. 5 and FIG. 6 to show internal components thereof.

In particular, in FIG. 5, complementary shapes of the portions 212 of the slidable frame 210 are depicted, which show the portions 212 mating in the contracted position of the rollable display 202. Furthermore, cutouts 502 in the portions 212 are also depicted, through which the stationary frame 208 is seen. In general, the cutouts 502, which are formed by the portions 212 mating, may be where a printed circuit board (PCB), or PCBs, that assist in driving the electrical components of the rollable display 202, may be located and/or provide locations where the rollable display 202 may be bonded to the stationary frame 208. For example, while not depicted, the device 200 may further comprise display a PCB and/or display PCBs bonded to the stationary frame 208 at the location of the cutouts 502, such that the stationary frame 208 may assist at supporting and protecting such a PCB, or PCBs. Alternatively, a portion (e.g., a central portion) of the rollable display 202 may be bonded to the stationary frame 208 at the location of the cutouts 502, such that the stationary frame 208 supports the rollable display 202 (e.g., and as the central portion of the rollable display 202, in the region of the stationary frame 208 and/or the cutouts 502, doesn't move the as the rollable display 202 changes between the extended and contracted positions).

Furthermore, FIG. 5 depicts the respective ends 238-1, 238-2 of the plates 236-1, 236-2 forming respective slits 500-1, 500-2 with respective portions 212-1, 212-2 through which the rollable display 202 extends and contracts.

Similarly, FIG. 6 shows the device 200 with the rollable display 202 in the extended position (e.g., as in FIG. 4, with the motor 226 actuated accordingly, as described above), the rollable display 202 having extended through the slits 500-1, 500-2. In FIG. 6, the grooves 214 are also seen, and it is understood that the rails 216 have moved in the grooves 214 to move the portions 212 along a fixed path relative to the stationary frame 208.

Figure 7:
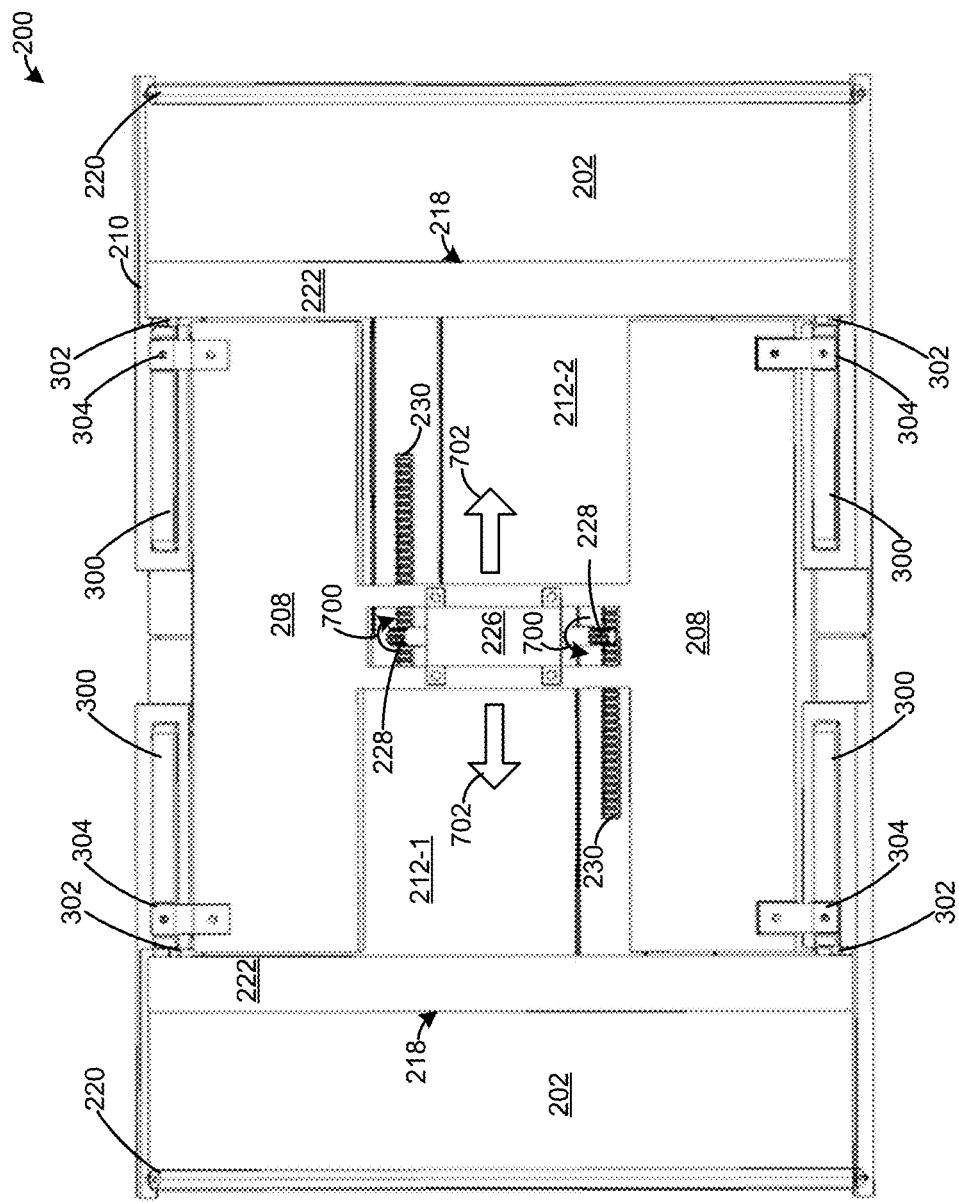
FIG. 7 is a rear view of the example device of FIG. 2, with the rollable display in the contracted position, a back cover and plates removed, and an extending mechanism in use.

Attention is next directed to FIG. 7 which depicts a backside of the device 200 with the plates 236 (e.g., and any back cover) removed to show the ends 218, and the fixtures 222, and with the rollable display 202 being transparent to show the rollers 220. As depicted in FIG. 7, the rollable display 202 is in the contracted position (e.g., similar to FIG. 3), and the motor 226 is depicted as turning the circular gears 228 in opposite directions, as indicted by respective arcs 700 that are in opposite directions. As such, the circular gears 228 move the linear gears 230 in opposite directions, towards respective ends 218, and the movement of the linear gears 230 is translated to respective portions 212, such that the portions 212 move in opposite directions, away from each other, as indicated by the arrows 702. Such movement causes the portions 212 to move and hence also causes the rollers 220 to move (e.g., the rollers 220 are seen through the rollable display 202 in FIG. 7), exerting force on the rollable display 202 to move the rollable display 202 towards the extended position.

Attention is next directed to FIG. 8 and FIG. 9 which depict a side view of a region of the device 200 that includes the portion 212-1 and one of the belts 300. A sidewall 213 of the portion 212-1 is further removed to show details of the belt 300 as attached to the portion 212-1. In particular, the belt 300 is around two rotating pins 800 at opposing ends of the belt 300, the belt 300 attached (e.g., via the brace 304) in one position to the stationary frame 208 (not visible in FIG. 8 and FIG. 9, but nonetheless understood to be present), the belt 300 otherwise to roll around the rotating pins 800 in conjunction with movement of the extending mechanism 204 as the rollable display 202 is extended or contracted.

It is further understood, comparing FIG. 8 and FIG. 9, that the motor 226 is moving the portion 212-1 (e.g., via the gears 228, 230) and the rollable display 202 from the contracted position in FIG. 8 to the extended position in FIG. 9.

Further, as depicted, the belt 300 includes a hook 802 at a side adjacent the rollable display 202. As with the hook 224 of the fixture 222, the hook 802 may include any suitable attachment mechanism. As is also apparent from FIG. 8, the hook 224 of the fixture 222 is also at a side adjacent the rollable display 202.

As is now further apparent from FIG. 8 (e.g., and FIG. 9), the spring 302 (e.g., and/or a spring mechanism) extends between a given position of the belt 300, such as from the hook 802, and an end 218 of the rollable display 202, such as to the hook 224. Furthermore, a distance 804 between the given position of the belt and the end 218 of the rollable display 202 (e.g., as depicted between the hooks 224, 802) is selected, in combination with a spring constant of the spring 302, to maintain a given suitable tension on the rollable display 202. For example, the spring 302 pulls on the rollable display 202 according to a suitable tension at the distance 804. As will be explained hereafter, the spring generally maintains an about constant tension on the rollable display 202 regardless of a position of the rollable display 202, due to movement of the belt 300 as the extending mechanism 204 moves with the portion 212-1 (e.g., and the portion 212-2) as the distance 804 between the given position of the belt 300, as represented by the hook 802, and the end 218 of the rollable display 202, as represented in FIG. 8 by the hook 224, remains about constant as the belt 300 moves around the rotating pins 800 as the rollable display 202 is extended or contracted. While the distance 804 is depicted as about a distance that the portion 212-1 moves, relative to the stationary frame 208, the distance that the portion 212-1 moves, relative to the stationary frame 208 may be less than the distance 804.

Such movement of the depicted portion 212-1 is represented by an arrow 806, which causes the belt 300 to rotate around the pins 800, as represented by an arrow 808.

Movement of the depicted portion 212-1 further causes the roller 220 to move with the depicted portion 212-1, as represented by an arrow 810, which causes the rollable display 202 to roll around the roller 220, as represented by an arrow 812, with an arc 814 representing the roller 220 turning as the rollable display 202 moves around the roller 220.

As such, the rollable display 202, moves into the extended position shown in FIG. 9.

Furthermore, comparing FIG. 8 and FIG. 9, it is understood that movement of the depicted portion 212-1, and movement of the belt 300 further causes the hooks 224, 802 to maintain the same distance 804 therebetween as the portion 212-1 and the belt 300 moves. As such, the tension that the spring 302 exerts on the rollable display 202 remains about constant as the portion 212-1 and the belt 300, and the rollable display 202, move.

It is hence further understood that a distance between the pins 800 may be selected to at least a distance that the portion 212-1 moves (e.g., and the hook 802 moves). A length of the belt 300 may be similarly selected to accommodate the distance between the pins 800 and movement of the hook 802 as the portion 212-1 moves.

Movement of the rollable display 202 from the extended position in FIG. 9 to the contracted position in FIG. 8 occurs in a similar manner, but with the arrows 806, 808, 810, 812, and the arc 814 in directions opposite to that in FIG. 8. Furthermore, as the motor 226 moves the portion 212-1, and the rollable display 202, from the extended position in FIG. 9, to the contracted position in FIG. 8, the tension from the spring 302 pulls on the rollable display 202 to pull the rollable display 202 into the contracted position. Such movement is in contrast to movement of the rollable display 202 from the contracted position into the extended position which occurs via the roller 220 exerting a force on the rollable display 202.

Furthermore, it is understood that motion of the components of the example of FIG. 8 and FIG. 9 that is described with respect to one belt 300 and/or tension mechanism 206, may occur at all the belts 300 and/or tension mechanisms 206 to move and/or extend and/or contract both ends 218 of the rollable display 202. However, the example of FIG. 8 and FIG. 9 illustrates that motion of belts 300 and/or tension mechanism 206, may occur at one end 218 of the rollable display 202 and not another end of the rollable display 202, for example, when movement of the gears 228, 230 on the two shafts of the motor 226 are decoupled from each other, and/or when only one 218 of the rollable display 202 is configured to expand or contract as described herein.

Further alternatives are within the scope of the present specification. For example, a device provided herein may comprise: the rollable display 202 having opposing ends 218; and movable rollers 220 around which the rollable display 202 rolls, as the movable rollers 220 move, such that the opposing ends 218 move relative to the movable rollers 220. Such a device may further comprise the belts 300 that move with the movable rollers 220 and the opposing ends 218, with respective given portions of the belts 300 being in a fixed position (e.g., similar to as provided with the braces 304) relative to the movable rollers 220 and the opposing ends 218, a remainder of the belts 300 rotating as the belts 300 move with the movable rollers 220. Such a device may further comprise: springs 302 respectively attached to respective moveable attachments points (e.g., the hooks 802, and the like) of the belts 300 and respective ends 218, of the opposing ends 218, of the rollable display 202 (e.g., at the hooks 224, and the like), the respective moveable attachment points moving a same distance as the opposing ends 218 of the rollable display as the belts 300 rotate, and as the rollable display 202 rolls around the movable rollers 220, such that the springs maintain a constant tension on the rollable display 202.

Put another way, in such examples, the slidable frame 210 and/or the stationary frame 208 may be replaced with any suitable mechanism to cause the belts 300 to move with the movable rollers 220, with respective given portions of the belts 300 being in a fixed position relative to the movable rollers 220 and the opposing ends 218. For example, the belts 300 may be located on respective robotic arms that include the pins 800, with a portion that extends to include support for the rollers 220, and the like.

However, such examples, the device may include the slidable frame 210, and the like, with the movable rollers 220 and the belts 300 attached to the slidable frame 210; and the motor 226 to move the slidable frame.

In such examples, it is further understood that the respective moveable attachment points may comprise the hooks 224, and that the belts 300 rotate around respective pairs of the rotating pins 800.

In yet further examples, the motor 226 and the gears 228, 230 may be removed and the rollable display 202 may be moved between the expanded and contracted positions manually.

Figure 10:
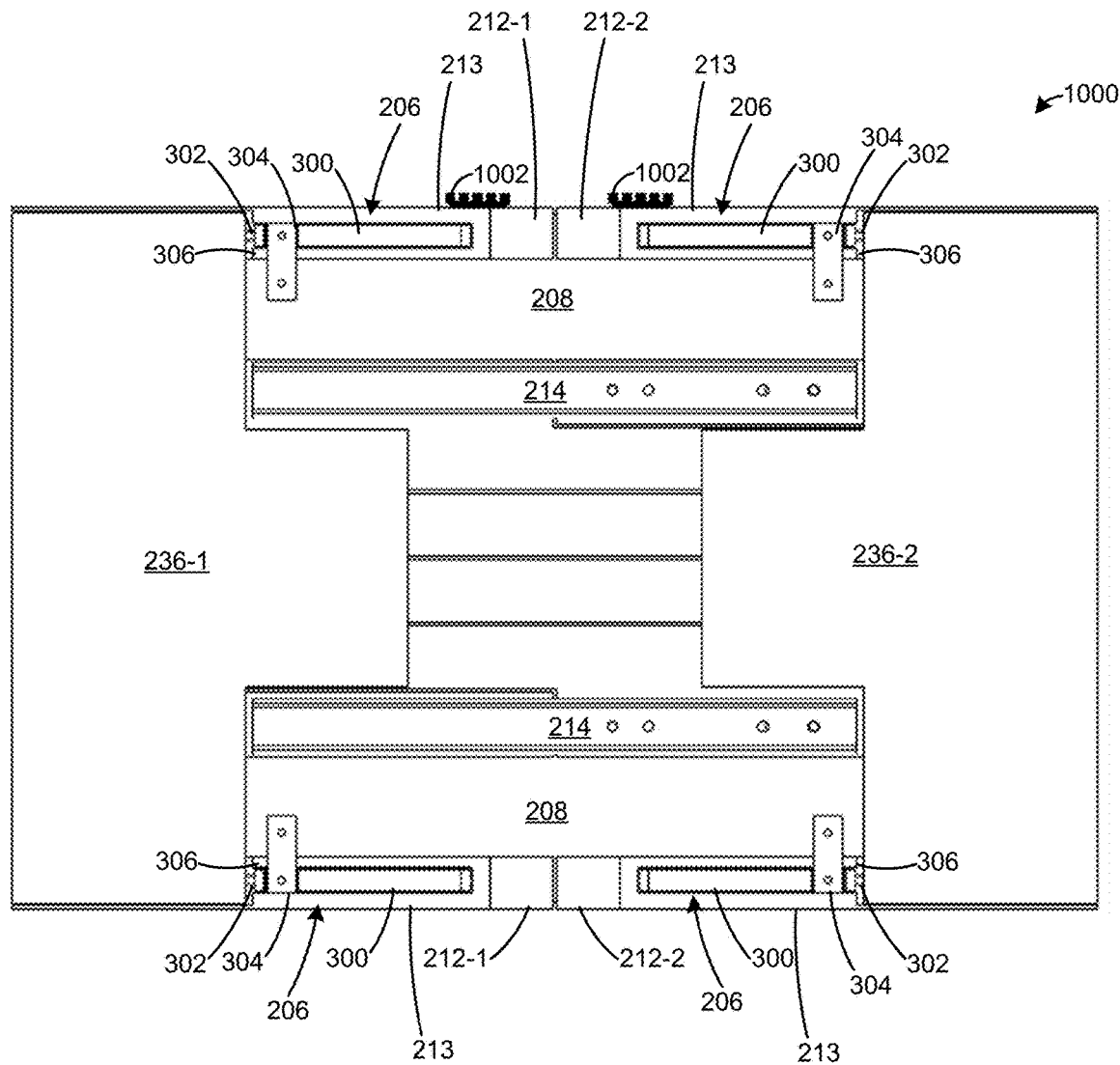
FIG. 10 is a rear view of an example device that includes a rollable display with tension control that is operated manually.

For example, attention is next directed to FIG. 10 which depicts a rear view of example device 1000 that is substantially similar to the device 200, with like components having like numbers, but adapted to remove the motor 226 and the gears 228, 230. While not depicted, the device 1000 may further comprise a back cover to hide and protect internal components thereof. The device 1000 is further depicted in a contracted position of the rollable display 202 (not visible in FIG. 10, but nonetheless understood to be present) similar to as in FIG. 3. In particular, the device 100 comprises the tension mechanisms 206 that include the belts 300, the springs 302, the braces 304, as well as the frames 208, 210, the opposing sidewalls 213, 306, the grooves 214 (and the rails 216, not depicted, but nonetheless understood to be present), and the plates 236.

However, in further contrast to the device 200, the device 1000 may further include a knob 1002 (e.g., when one end 218 of the rollable display 202 is movable) or knobs 1002 (e.g., when both ends 218 of the rollable display 202 are movable) to move the slidable frame 210. For example, as depicted, a knob 1002 is attached to respective portion 212 such that a knob 1002 may be grasped by a user and moved to move a portion 212, as well as the tension mechanisms 206, to expand, or contract, the rollable display 202, as described herein.

Alternatively, and/or in addition to the knobs 1002, the plates 236 attached to the slidable frame 210 and/or the portions 212 may be grasped by a user to pull or push the slidable frame 210 and/or the portions 212 to expand, or contract, the rollable display 202, as described herein.

At the device 1000, the portions 212 may be moved independent of one another. However, in other examples, the portions 212 may be joined by an apparatus, such as a gear assembly and the like, such that, when one portion 212 is moved a distance in one direction (e.g., via a knob 1002 and/or a plate 236 being moved), the other portion 212 is moved a similar and/or a same distance in an opposite direction.

It should be recognized that features and aspects of the various examples provided above may be combined into further examples that also fall within the scope of the present disclosure.

The invention claimed is:

1. A device comprising:
a rollable display;
an extending mechanism to adjust the rollable display between an extended position and a contracted position;
a tension mechanism to maintain a constant tension on the rollable display as the rollable display is adjusted between the extended position and the contracted position; and
a stationary frame, and
wherein the tension mechanism comprises:
a belt around two rotating pins that are connected to the slidable frame at opposing ends of the belt, the belt attached in one position to the stationary frame, the belt otherwise to roll around the rotating pins in conjunction with movement of the extending mechanism as the rollable display is extended or contracted; and
a spring extending between a given position of the belt and an end of the rollable display, the spring maintaining the constant tension on the rollable display, a distance between the given position of the belt and the end of the rollable display remaining constant as the belt moves around the rotating pins as the rollable display is extended or contracted.

2. The device of claim 1, wherein the extending mechanism comprises:
a motor in a fixed position, relative to the rollable display; and
a gear assembly that is movable by the motor to move an end of the rollable display.

3. The device of claim 1, wherein the extending mechanism comprises:
a roller that moves with an end of the rollable display, the rollable display to roll around the roller.

4. The device of claim 1, wherein the extending mechanism comprises:
a stationary frame; and
a slidable frame that moves relative to the stationary frame.

5. A device comprising:
a rollable display;
a stationary frame;
a slidable frame slidably attached to the stationary frame, the slidable frame being in two portions that move in opposite directions, relative to the stationary frame;
rollers around which opposing ends of the rollable display roll as the two portions move, the rollers attached to the two portions, and the rollers move with the two portions; and
tension mechanisms attached to the two portions that move with the two portions, the tension mechanisms further attached to opposing ends of the rollable display to maintain a constant tension on the rollable display as the rollable display rolls around the rollers as the two portions move,
wherein a respective tension mechanism, of the tension mechanisms, comprises:
a belt rollably attached to a respective portion of the two portions of the slidable frame;
a spring extending between a given position of the belt and a respective end of the rollable display; and
a brace attaching the belt to the stationary frame, such that, as the respective portion moves, a section of the belt attached to the brace remains stationary relative to the stationary frame, and a remainder of the belt rotates relative to the stationary frame to maintain a constant distance between the given position of the belt and the respective end of the rollable display.

6. The device of claim 5, wherein, for a respective portion of the two portions of the slidable frame, there is one respective roller, and two respective tension mechanisms.

7. The device of claim 5, further comprising fixtures at the opposing ends of the rollable display, the tension mechanisms attached to the fixtures.

8. The device of claim 5, further comprising a back cover attached to a backside of the stationary frame.

9. A device comprising:
- a rollable display having opposing ends;
- movable rollers around which the rollable display rolls, as the movable rollers move, such that the opposing ends move relative to the movable rollers;
- belts that move with the movable rollers and the opposing ends, respective given portions of the belts being in a fixed position relative to the movable rollers and the opposing ends, a remainder of the belts rotating as the belts move with the movable rollers; and
- springs respectively attached to respective moveable attachments points of the belts and respective ends, of the opposing ends, of the rollable display, the respective moveable attachment points moving a same distance as the opposing ends of the rollable display as the belts rotate, and as the rollable display rolls around the movable rollers, such that the springs maintain a constant tension on the rollable display.

10. The device of claim 9, wherein the respective moveable attachment points comprise hooks.

11. The device of claim 9, wherein the belts rotate around respective pairs of rotating pins.

12. The device of claim 9, further comprising:
- a slidable frame, the movable rollers and the belts attached to the slidable frame; and
- a motor to move the slidable frame.

13. The device of claim 9, further comprising:
- a slidable frame, the movable rollers and the belts attached to the slidable frame; and:
- plates attached to the slidable frame to pull or push the slidable frame; or
- a knob or knobs to move the slidable frame.

\* \* \* \* \*